United States Patent Office 3,268,619
Patented August 23, 1966

3,268,619
FLAME RETARDANT EPOXY RESINS
Richard C. Nametz, St. Louis, Mich., assignor to Michigan Chemical Corporation, St. Louis, Mich., a corporation of Michigan
No Drawing. Filed Oct. 12, 1962, Ser. No. 230,242
The portion of the term of the patent subsequent to Oct. 16, 1979, has been disclaimed
6 Claims. (Cl. 260—831)

This invention relates to flame retardant epoxy resins in admixture with flammable epoxy resins, in particular novolak epoxy resins, to render them flame retardant.

This application is a continuation-in-part of my earlier filed application entitled Flame Retardant Epoxy Resins, Serial Number 753,193, filed August 5, 1958, now United States Patent Number 3,058,946.

In the recent past, the epoxy resins have been produced and used in rapidly increasing volume. These resins have found wide-spread use in surface coatings, adhesives, laminates, castings, plastic tools and dies, foams, molding compounds and a number of miscellaneous uses. These resins have valuable properties which adapt them for these widely varied uses, although their flammability is an undesirable property in many of these uses.

It is an object of this invention to provide an epoxy type resin mixture which is fire retardant.

It is a further object to provide epoxy resin mixtures which can be cured and otherwise processed in the same manner as the epoxy resins heretofore produced and which retain the valuable properties of the epoxy resins, but which are of materially reduced flammability.

Other objects of this invention and its various advantageous features will become apparent as this description proceeds.

The product in accordance with this invention is a hardenable mixture, one component of which is a condensation product of a nuclear brominated bisphenol with a halohydrin and is, itself, a bromine-containing epoxy resin. This bromine-containing polyepoxide is mixed with a novolak epoxy resin to form a hardenable resin mixture. Thus, hardenable or curable admixtures of these bromine-containing polyepoxides with the novolak epoxy resins can be cured and otherwise processed in the same manner as the conventional polyepoxide compounds and mixtures.

The nuclear brominated bisphenol which forms one of the essential constituents of the brominated condensation product is a bisphenol which carries a total of from one to four bromine atoms on its phenyl groups.

The brominated bisphenol which is used may be an alkylidene bisphenol, a sulfone bisphenol or a ketone bisphenol. The alkylidene bisphenol may be represented by the following structural formula:

FORMULA I

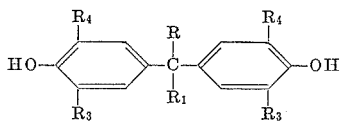

in which R and $R_1$ are the same or different and may be hydrogen or alkyl groups, aryl or substituted aryl groups, cyanoalkyl groups, carboxy alkyl groups, alkoxy alkyl groups or cycloalkyl groups, containing from one to seventeen carbon atoms, $R_3$ is bromine and $R_4$ is bromine or hydrogen. The brominated bisphenol may be, for example, bis(3-bromo-4-hydroxyphenyl) methane
2,2-bis(3-bromo-4-hydroxyphenyl) propane
bis(3-bromo-4-hydroxyphenyl) diphenyl methane
1,1-bis(3-bromo-4-hydroxyphenyl)-1(2,5-dibromophenyl) ethane
2,2-bis(3-bromo-4-hydroxyphenyl) propionitrile
4,4-bis(3-bromo-4-hydroxyphenyl) pentanoic acid
2,2-bis(3-bromo-4-hydroxyphenyl) 1-ethoxypropane
bis(3,5-dibromo-4-hydroxyphenyl) methane
2,2-bis(3,5-dibromo-4-hydroxyphenyl) propane
bis(3,5-dibromo-4-hydroxyphenyl) diphenylmethane
1,1-bis(3,5-dibromo-4-hydroxyphenyl)-1(2,5-dibromophenyl) ethane
2,2-bis(3,5-dibromo-4-hydroxyphenyl) propionitrile
2,2-bis(3,5-dibromo-4-hydroxyphenyl) 1-ethoxypropane
4,4-bis(3-bromo-4-hydroxyphenyl) pentanoic acid The brominated sulfone bisphenol which is used may be represented by the following structural formula:

FORMULA II

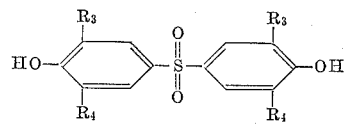

in which $R_3$ and $R_4$ have the same meaning as in Formula I. This brominated bisphenol may be, for example, bis(3-bromo-4-hydroxyphenyl) sulfone
bis(3,5-dibromo-4-hydroxyphenyl) sulfone The brominated ketone bisphenol which is used may be represented by the following structural formula:

FORMULA III

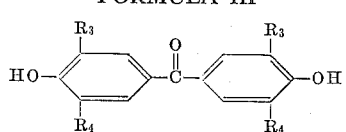

in which $R_3$ and $R_4$ have the same significance as in Formulas I and II.

Of these various nuclear brominated bisphenols, I prefer to use 2,2-bis(3,5-dibromo-4-hydroxyphenyl) propane which, for the sake of brevity will hereinafter be referred to as "tetrabromobisphenol-A," since it may be prepared by the bromination of p,p-isopropylidenebisphenol which is commonly known as "bisphenol A."

The epihalohydrin which is the other reactive ingredient of the condensation product may be, for example epichlorohydrin, epibromohydrin or glycerolchlorohydrin. I have found that epichlorohydrin is entirely satisfactory for this purpose, and in general, I prefer to use it in the production of my condensation product.

A stoichiometric excess of an epihalohydrin is reacted with a nuclear brominated bisphenol in the presence of an alkaline material by methods known to the prior art. I may, for example, react about 2 moles to about 20 moles of the epichlorohydrin with each mole of the brominated bisphenol and prefer to react about 6 moles to about 12 moles of the epichlorohydrin with each mole of the brominated bisphenol. The considerable excess of the epichlorohydrin in this reaction, as in the reaction of the non-brominated bisphenol, is preferred in order to avoid undesirable side reactions. Suitable alkaline materials are sodium hydroxide, potassium hydroxide, sodium carbonate, sodium bicarbonate, potassium carbonate and potassium bicarbonate. It is desirable to use an amount of the alkaline material slightly in excess of the 2 mole equivalents of the alkaline material for each mole of polyol, e.g. brominated bisphenol present to carry the reaction to completion. An excessive quantity of the alkaline material tends to cause undesired side reactions. Thus, the amount of the alkaline material used for each mole of the brominated bisphenol present in the reaction mixture is preferred to be confined within the range of about 2 moles to about 2.5 moles.

As will be appreciated from the foregoing, the preferred brominated condensation product is that formed by the reaction of tetrabromobisphenol-A with epichlorohydrin. It is believed that this condensation reaction proceed, in the presence of an alkaline material, in accordance with the following equation:

The structure of the conventional novolak resin is believed to be as follows:

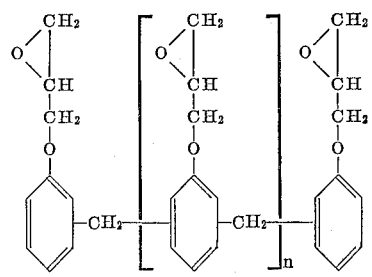

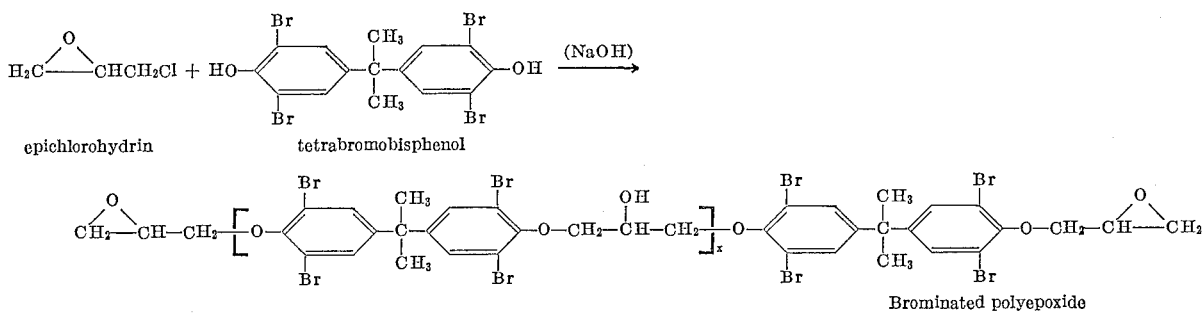

In the foregoing formula for the brominated polyepoxide formed by this reaction, $x$ may be an integer from one to twelve depending upon the exact manner in which the reaction is carried out. A product in which the $x$ is zero may be produced by this reaction, which is believed to have the following structural formula:

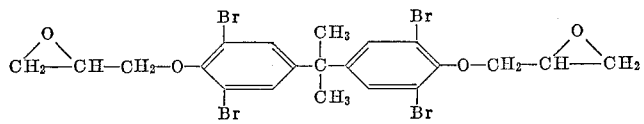

where $n$ is about 1.5. However, there are many possible variations of structure and all are within the scope of the present invention.

The conventional method of preparing the novolak epoxy resin is described in Patent Number 2,911,388. As disclosed in this patent, phenol is reacted with formaldehyde in an acidic solution to form a crude novolak resin. This crude novolak is then subjected to etherification by reaction with an epihalohydrin, such as epichlorohydrin. The product is thus a hardenable novolak epoxy resin. These novolak epoxy resins can be cured with the same curing agents and substantially in the same manner as the conventional epoxy resins.

The crude novolak resin which is the basis of the novolak epoxy resin can be formed by the acidic reaction of mono-, di or polyhydric materials, such as hydroxy-aromatic materials. In the di- or polyhydric materials the hydroxyl groups can be in the ortho or para position with respect to each other. Examples of suitable materials are resorcinols, cresols, bisphenols and the like. The hydroxy compounds can be substituted, as with a halogen such as bromine, or may be unsubstituted. All that is required is the hydroxy material contain at least one active hydrogen from the hydroxyl group or groups that can be subjected to subsequent etherification with a halohydrin, e.g. epihalohydrin.

The epoxy novolak resins have the disadvantage of being very flammable. Thus, they cannot be used where service conditions require a non-flammable resin. Unexpectedly, it has been found that when the epoxy novolak resins are mixed with the brominated bisphenol condensation products of this invention, hardenable resin composi- These bromine-containing polyepoxides are ordinarily tan in color. They can be cured by essentially the same procedure and by the use of the same catalysts that are used for the curing of the conventional non-brominated polyepoxides. The curing reaction of these bromine-containing polyepoxides has been observed to be less exothermic than that of the curing of the conventional non-brominated polyepoxides. They harden somewhat more slowly than the non-brominated polyepoxides and therefore, require a somewhat longer curing time.

Upon curing these fromine-containing polyepoxides produce plastics which have satisfactory hardness and strength as compared with the plastics produced from the conventional non-brominated polyepoxides. The plastics produced by the curing of the bromine-containing polyepoxides remain hard, strong and tough after immersion in boiling water for ten minutes.

The novolak epoxy resins which were admixed with the brominated epoxy resins set forth above, are a relatively new type of epoxy resin. However, these novolak epoxy resins have the characteristic epoxide linkage found in the older conventional epoxy resins. These epoxy novolak resins can be used in high temperature service and are resistant to chemical attack and are therefore very useful. The hardenable epoxy novolak resins are completely compatible with other epoxy resins.

tions are produced which are highly resistant and which will not support combustion.

The bromine-containing polyepoxides are generally compatible in all proportions with the novolak epoxy resins. The admixture of the bromine-containing polyepoxides, even in relatively minor proportions, with the novolak epoxy resins followed by the curing of the mixture, results in a plastic which does not support combustion or has a materially shorter burning time than the corresponding plastic produced solely from the non-brominated polyepoxides. The plastics produced by the curing of the mixture of the bromine-containing polyepoxides with the novolak epoxy resins has in addition to the materially reduced flammability, substantially improved physical and chemical properties.

In the production of epoxy plastics which are of reduced flammability or which are non-flammable, the brominated polyepoxide may be admixed with the novolak epoxy resins in a wide range of proportions. It has been found that the effectiveness of any particular brominated condensation product in reducing the flammability of such a mixture is approximately proportional to the percentage by weight of bromine which it carries. The brominated polyepoxides are more expensive to produce than the novolak epoxy resins. For this reason, it is desirable to utilize the smallest proportion of the brominated polyepoxide in such a mixture which will give the reduction in flammability or of non-flammability which may be required for the particular end use involved.

The effectiveness of the bromine-containing polyepoxide in reducing the flammability of the novolak epoxy resins depends upon the exact chemical structure of the bromine containing polyepoxide. However, the relative proportions required can be illustrated in the case of mixtures of the polyepoxide resulting from the condensation of tetrabromobisphenol-A with epichlorohydrin with, for example, the commerical novolak epoxy resin known by the trade name DEN 438$_{TM}$ marketed by the Dow Chemical Company. Mixtures of 10% by weight, of this bromine-containing polyepoxide with 90%, by weight, DEN 438$_{TM}$, when in the form of a cured, solid plastic bar, will not support continued combustion and is self-extinguishing. A higher proportion of the bromine-containing polyepoxide is, naturally, required to render the mixture self-extinguishing when the mixture is in the form of a solid foam. However, as little as 20%, by weight, of the bromine-containing polyepoxide in admixture with 80%, by weight, of the novolak epoxy resin can be used to produce a solid foam which is self-extinguishing after it has been ignited by a flame.

The cured mixtures of bromine-containing polyepoxides and the novolak epoxy resins in accordance with this invention may contain each of these types of polyepoxides in any desired relative proportions. Thus, they may contain from about 1%, by weight, to about 99%, by weight, of the bromine-containing polyepoxide with the remainder of the polyepoxide content of the composition being the novolak epoxy resin. However, in general, an amount of the bromine-containing polyepoxide within the range of about 2%, by weight, to about 50%, by weight, of their mixture with the novolak epoxy resin is adequate to give the mixture the flame-retardancy required for the majority of end uses. I have found that it is usually preferable to include about 8%, by weight, to about 25%, by weight, of the bromine-containing polyepoxide in the composition, with the remainder being the novolak epoxy resin. As brought out hereinafter, about 10%, by weight, of the bromine-containing epoxy resin in admixture with 90% by weight, of the novolak epoxy resin, produces a self-extinguishing composition which, in the form of a slender, solid strip, burned for only a very brief period after the removal of an igniting flame.

From the foregoing discussion, it will be understood that the maximum of 50%, by weight, of the bromine-containing polyepoxide is specified for economic reasons, since this percentage is usually adequate to secure adequate non-flammability and self-extinguishing properties.

The proportions of the preferred mixtures can be expressed in terms of a weight ratio of the novolak epoxy resin (B) to the bromine containing polyepoxides (A). Thus, the preferred ratios of B to A are between 49 to 1 and 1 to 1.

The curing of the novolak epoxy resins is now a well developed art. An advantage offered by the bromine-containing polyepoxides in admixture with the novolak epoxy resins in accordance with this invention, arises from the fact that they may be cured by following, generally the technology, for the curing of non-bromine containing polyepoxides. The curing reaction of the bromine-containing polyepoxides is, generally, less exothermic than that of the curing of the novolak epoxy resins. Further, the bromine-containing polyepoxides harden somewhat more slowly than the novolak epoxy resins and, therefore, require a somewhat longer curing time.

The curing agents for the mixtures of the bromine-containing polyepoxides in accordance with this invention, and the amount in which they are used are generally similar to those used in the curing of the conventional polyepoxides. Thus, suitable curing agents for these admixtures include primary, secondary, and tertiary amines, with the primary amines being generally more useful. Suitable amine curing agents are, for example, aliphatic amines, such as, diethylene triamine and diethylaminopropylamine, the monopropylene oxide adduct of ethylenediamine, aromatic amines, such as methylene dianiline, dimethylamino-methylphenol, tri - (dimethylaminomethyl) phenol, metaphenylenediamine and the polyamide resins, sold under the trade names Versamide 100, Versamide 115 and Versamide 125 and many others. The commercial polyamides (e.g. Versamid resins) are amber colored thermoplastic resins with molecular weights up to about 10,000 and melting points up to about 190° C. as disclosed in "Epoxy Resins, Their Application and Technology" McGraw-Hill Book Company, Inc., N.Y. (1957), at pages 168–169.

Other curing agents which may be used for the curing of the bromine-containing polyepoxide and the novolak epoxy resin mixtures include boron trifluoride, and complexes of boron trifluoride, such as, for example, a boron trifluoride-triethanol amine complex. Suitable curing agents for this purpose also include dibasic acids and other polybasic acids and their anhydrides. Thus, for example, phthalic anhydride, maleic anhydride, and pyromellitic anhydride and their corresponding acids are suitable for this purpose. Further, glycols can be used for curing. Further, various combinations of curing agents may be used.

The method for the preparation of the bromine-containing polyepoxide component of the mixtures of this invention is illustrated by Example I.

*Example I*

PREPARATION OF A COPOLYMER OF TETRABROMOBISPHENOL-A AND EPICHLOROHYDRIN COMPONENT

A solution of 1088 grams (2.0 moles) of tetrabromobisphenol-A in 1851 grams (20.0 moles) of epichlorhydrin was prepared and placed in a 5 liter, 3-necked flask provided with a mechanical stirrer, a reflux condenser and a thermometer. Thirty-two grams of sodium hydroxide pellets and 9.2 grams (0.51 moles) of water were then added to the mixture, which was then heated to 102° C. and the heating stopped. At this temperature there were only traces of reflux condensation on the sides of the flask. The exothermic heat of the reaction raised the temperature of the reaction mixture to 107° C. at which active reflux started. The reaction mixture had become black during the first ten minutes of heating and was this color when the active reflux began. After the reaction mixture had refluxed for about 4–5 minutes, all of the sodium hydroxide had dissolved, after another 3 minutes a precipitate of sodium chloride began to form and the reaction mixture became light tan. After another 11 minutes the temperature of the reaction mixture dropped to 102° C. and the reflux stopped. An additional 13 grams of sodium hydroxide pellets were added to the reaction mixture and when no exothermic heat was developed after 4 minutes, an additional 14 grams of sodium hydroxide pellets were added. The temperature of the reaction mixture continued to drop and after another 15 minutes was down to 96° C. External heat was again applied to the reaction mixture and an additional 27 grams of sodium hydroxide pellets were added. Thirty minutes later, when the temperature of the reaction mixture reached 98° C. the reflux again started. Two additional portions of sodium hydroxide pellets, of 27 grams each, were added to the reaction mixture at 15 minute intervals, to bring the total sodium hydroxide added to 163.2 grams or 4.08 moles. After the last portion of sodium hydroxide was added to the reaction mixture, it was refluxed for 40 minutes, then cooled and filtered with suction. The sodium chloride filtrate removed from the reaction mixture was dried and found to weigh 237.0 grams. The filtrate was vacuum distilled to remove water and the excess chlorohydrin, taking the still temperature up to 141° C. at 3 mm. absolute mercury pressure, with a distillation temperature of 58° C. 8 ml. of water and 1211 grams of epichlorohydrin (82% of the theoretical excess) were collected. The resin remaining in the still pot was cooled, diluted with 700 ml. of benzene and filtered using Dicalite L filter aid. The filtrate was washed with one-half of its own volume of a 5%, by weight, sodium hydroxide solution and then with one-half of its volume of a 2%, by weight, sodium hydroxide solution. The filtrate was then tested for bispheol-A and found to be free of it. It was then washed three times with successive portions of one-half of its own volume of water and its residual alkalinity neutralized by washing it with a very dilute aqueous solution of hydrochloric acid which contained only enough hydrogen chloride to render it acidic. The filtrate was then washed to free it of residual acid, refluxed utilizing a water-trap to dry it and again filtered using Dicalite L as a filter aid. The filtered solution of the polyepoxide was then freed of benzene by distillation under vacuum (17 mm. of mercury, absolute) while taking the still temperature to 156° C. with a distillation temperature of 156° C. The desired bromine-containing polyepoxide resin remained as a residue in the still pot, and was found to weigh 1237 grams, representing a theoretical yield of 94%, by weight. This polyepoxide was medium tan in color and hazy. It was barely solid at room temperature and became soft when handled. It showed traces of crystallization after 3 days, but the amount of crystallized material did not increase upon standing for one week. It was compatible with the DEN 438$_{TM}$ in all proportions.

As a comparator to determine the relative values of bromine atoms and chlorine atoms in reducing the flammability of a polyepoxide, a chlorine-containing polyepoxide was prepared as described by Example II.

*Example II*

PREPARATION OF A COPOLYMER OF TETRACHLOROBISPHENOL-A AND EPICHLOROHYDRIN

A condensation product of tetrachlorobisphenol-A and epichlorohydrin was prepared, by the reaction of 20 moles of epichlorohydrin with 2 moles of tetrachlorobisphenol-A, by duplicating the procedure described by Example I for condensing tetrabromobisphenol-A with epichlorohydrin. A yield of 87% by weight, of the theoretical of the polyepoxide was produced. This chlorine-containing polyepoxide was a viscous liquid, very pale yellow in color and hazy. It started to crystallize upon standing for 2 to 3 days, and was completely crystallized after one week.

Table I gives a comparison of the properties of the condensation product of tetrabromobisphenol-A and epichlorohydrin prepared as described by Example I and those of the condensation product of tetrachlorobisphenol-A and epichlorohydrin prepared as described by Example II.

TABLE I.—COMPARISON OF THE PROPERTIES OF THE CONDENSATION PRODUCT OF TETRABROMOBISPHENOL-A, WITH EPICHLOROHYDRIN AND THE CONDENSATION PRODUCT OF TETRACHLOROBISPHENOL-A WITH EPICHLOROHYDRIN

| Resin | Color [1] | Epoxy Value [2] | Epoxide Equiv.[3] | Viscosities, cps. | | | Sol.[4] |
|---|---|---|---|---|---|---|---|
| | | | | 24° C. | 60° C. | | |
| Br—cont. Polyepoxide | 1 | 0.230 | 435 | | 98,000 | | 25 |
| Cl—cont. Polyepoxide | 1 | 0.309 | 324 | | 5,000 | | 24 |

[1] Gardner scale measured on a 40% by weight solution in butyl carbitol except as noted.
[2] Epoxy value equivalent per 100 gms. of resin.
[3] Grams of resin containing one equivalent weight of epoxide.
[4] Viscosity in cps. at 30° C. of a 40%, by weight, solution of the resin in butyl carbitol.

The effect of the bromine-containing epoxide of Example I and of the chlorine-containing polyepoxide of Example II in reducing the flammability of DEN 438$_{TM}$ were compared as described by Example III.

*Example III*

COMPARISON OF THE EFFECT OF THE BROMINE-CONTAINING POLYEPOXIDE AND OF THE CHLORINE-CONTAINING POLYEPOXIDE IN REDUCING THE FLAMMABILITY OF DEN 438$_{TM}$

Cured DEN 438$_{TM}$; mixtures of DEN 438$_{TM}$ with 5%, by weight, 10% by weight, and 20%, by weight, respectively, of the condensation product of the brominated bisphenol-A and epichlorohydrin in Example I and mixtures of DEN 438$_{TM}$ with 5%, by weight, 10% by weight, and 20%, by weight, of the chlorine-containing polyepoxide of Example II were prepared by using the curing agent methylene diamine and using a curing cycle of 2 hours at 100° C. followed by 2 hours at 130° C. Strips having cross-sectional dimensions of $\frac{1}{16}$ inch by $\frac{1}{4}$ inch were cut off of each casting and marked 1 inch and 3 inches from one end. The flammability of each of these strips was tested by supporting it in a clamp with its longitudinal axis horizontal and its transverse axis inclined at 45 degrees to the horizontal. A piece of wire gauze was supported $\frac{3}{8}$ inch below the strip, so that $\frac{1}{2}$ inch of the strip projected beyond the gauze. The strip was ignited by holding a 1 inch gas flame under its outer end for 10 seconds and allowed to burn in a still atmosphere. It was found that only the bars of unmodified DEN 438$_{TM}$ burned for any appreciable distance, so only the total time the bar continued to burn could be used for comparative purposes. The DEN 438$_{TM}$ strips burned at the rate of 0.6 to 0.9 inch per minute, while the DEN 438$_{TM}$ strips containing 5%, by weight, of the bromine-containing polyepoxide of Example I burned at the rate of about 0.2 inch per minute. The strips containing 10%, by weight, and 20%, by weight, of the halogenated polyepoxides were so flame retardant that the flame did not travel along the sample and only the material heated by the flame during the ignition step continued to burn for a short time after the flame was removed.

The bromine-containing epoxide and the chlorine-containing epoxide were definitely effective in reducing the flammability of the novolak epoxy resin in amounts as low as 5%, by weight, and in making the non-halogenated polyepoxide flame retardant in proportions of 10%, by weight, and 20%, by weight. The bromine-containing polyepoxide was definitely more effective than the chlorine-containing polyepoxide in this respect at each percentage level. For example, about ten percent (10%), by weight, of bromine-containing epoxide was more effective than about 20%, by weight, of the chlorine-containing polyepoxide. In general, these data and other comparative tests demonstrate that at least about a two to four fold improvement in flame retardant characteristics is achieved with the bromine-containing polyepoxides when compared to the corresponding chlorine-containing epoxides.

From the foregoing, it will be appreciated that the bromine-containing polyepoxide mixtures with the novolak epoxy resins in accordance with this invention can be cured to produce plastics which on one hand have satisfactory physical characteristics and, on the other, offer the outstanding advantage of being self-extinguishing and adapted for uses in which non-flammability is of prime importance. Further, it will be understood from an analysis of the data presented by the foregoing examples that these bromine-containing polyepoxides offer an outstanding advantage arising from their compatibility with the novolak epoxy resins, the ease with which these mixtures can be cured, and the material reduction of the flammability of the novolak epoxy resins when the brominated polyepoxides are present only in relatively minor proportions.

It will be fully understood by those skilled in the resin chemistry that many changes, substitutions and variations can be made from the details which have been given in the foregoing specification and it is intended that this invention be limited only by the hereinafter appended claims.

I claim:
1. A hardenable resin composition which comprises a mixture of:
   (a) the bromine containing condensation product of a nuclear brominated bisphenol containing at least one, and not more than two, bromine atoms on each phenyl radical, and a halohydrin; and
   (b) a novolak epoxy resin.
2. A hardenable resin composition which comprises a mixture of:
   (a) the bromine containing condensation product of a nuclear brominated bisphenol containing at least one, and not more than two, bromine atoms on each phenyl radical, and a halohydrin; and
   (b) a novolak epoxy resin said weight ratio of (b) to (a) being between about 99 to 1 and about 1 to 99.
3. A hardenable resin composition which comprises a mixture of:
   (a) the bromine containing condensation product of a nuclear brominated bisphenol containing at least one, and not more than two, bromine atoms on each phenyl radical, and a halohydrin; and
   (b) a novolak epoxy resin having the structural formula:

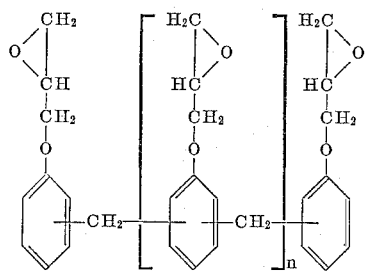

wherein $n$ is equal to about 1.5 on an average and wherein said weight ratio of (b) to (a) being between about 99 to 1 and about 1 to 99.
4. The composition of claim 3 wherein said (a) is the condensation product of epichlorohydrin and 2,2-bis(3,5-dibromo-4-hydroxyphenyl)propane.
5. The cured composition of claim 1.
6. The cured composition of claim 3.

References Cited by the Examiner
UNITED STATES PATENTS

| | | | |
|---|---|---|---|
| 3,016,362 | 1/1962 | Wismer | 260—47 |
| 3,051,681 | 8/1962 | Partansky | 260—830 |
| 3,058,946 | 10/1962 | Nametz | 260—47 |

SAMUEL H. BLECH, *Primary Examiner.*

JAMES A. SEIDLECK, MURRAY TILLMAN, *Examiners.*

E. J. TROJNAR, *Assistant Examiner.*